US012648030B2

(12) United States Patent
Kuoppamaki et al.

(10) Patent No.: US 12,648,030 B2
(45) Date of Patent: Jun. 2, 2026

(54) NETWORK CONNECTION INITIATION BASED ON APPLICATION-SPECIFIC EVALUATION OF NETWORK CAPABILITIES

(71) Applicant: T-Mobile USA, Inc., Bellevue, WA (US)

(72) Inventors: Karri M. Kuoppamaki, Kirkland, WA (US); Gaviphat Lekutai, Kirkland, WA (US); Jun Liu, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 431 days.

(21) Appl. No.: 18/478,369

(22) Filed: Sep. 29, 2023

(65) Prior Publication Data

US 2025/0113389 A1     Apr. 3, 2025

(51) Int. Cl.
*H04W 4/00*          (2018.01)
*H04W 36/00*         (2009.01)
*H04W 36/30*         (2009.01)
*H04W 76/10*         (2018.01)

(52) U.S. Cl.
CPC ....... *H04W 76/10* (2018.02); *H04W 36/0061* (2013.01); *H04W 36/304* (2023.05)

(58) Field of Classification Search
None
See application file for complete search history.

(56) References Cited

U.S. PATENT DOCUMENTS

| | | | |
|---|---|---|---|
| 8,290,527 B2 | 10/2012 | Richardson | |
| 8,489,106 B2 * | 7/2013 | Zhou ..................... | H04W 36/26 |
| | | | 455/452.2 |
| 8,503,997 B2 * | 8/2013 | Razoumov .......... | H04L 41/5058 |
| | | | 455/406 |
| 9,596,166 B2 | 3/2017 | Iyer et al. | |
| 9,641,424 B1 * | 5/2017 | Swig ..................... | H04L 47/822 |
| 9,674,766 B2 | 6/2017 | Braithwaite | |
| 9,717,038 B2 | 7/2017 | Kazmi | |
| 9,918,271 B2 | 3/2018 | Yang et al. | |
| 9,936,469 B2 | 4/2018 | Ji et al. | |
| 10,028,183 B2 | 7/2018 | Ankel et al. | |
| 10,165,467 B2 | 12/2018 | Papa et al. | |
| 10,674,332 B2 * | 6/2020 | Mineiro Ramos de Azevedo ...... | |
| | | | H04W 4/46 |

(Continued)

FOREIGN PATENT DOCUMENTS

| | | |
|---|---|---|
| CN | 105210345 B | 3/2019 |
| CN | 107911421 B | 5/2020 |

(Continued)

*Primary Examiner* — Amancio Gonzalez
(74) *Attorney, Agent, or Firm* — Perkins Coie LLP

(57)          ABSTRACT
Systems and methods for monitoring network capabilities and initiating network connections based on application-specific requirements are described herein. The system can obtain a first network connection request associated with a first process. The system can receive, at the user equipment system, a first information block associated with a first network node. The system can, based on determining that the first network capability metadata in the first information block is consistent with the first network connection request, initiate a connection with the first network node. The system can execute the first process while connected to the first network node.

20 Claims, 7 Drawing Sheets

500

| Attribute Requirement Mapping 502 | | | | |
|---|---|---|---|---|
| Application Type 504 | | Satellite-Enabled Application | V2X Application | | UAV Application |
| | | | Basic | Advanced | |
| Downlink Speed 506 | Min. 512 | 3 Mbps | 10 Mbps | 500 Mbps | 1 Gbps |
| | Rec. | 4 Mbps | 15 Mbps | 950 Mbps | 2.5 Gbps |
| | Max. | 5 Mbps | 25 Mbps | 1 Gbps | 3 Gbps |
| Uplink Speed 508 | Min. 514 | 0.5 Mbps | 1 Mbps | 50 Mbps | 1 Gbps |
| | Rec. | 0.75 Mbps | 3 Mbps | 95 Mbps | 1.3 Gbps |
| | Max. | 1 Mbps | 5 Mbps | 100 Mbps | 1.5 Gbps |
| Maximum Latency 510 | | 500 ms | 40 ms | 10 ms | Application Type |
| Dedicated Band Requirement 516 | | N/A | N/A | N/A | 600 MHz |

(56)                  References Cited

U.S. PATENT DOCUMENTS

| 11,153,225 | B2 * | 10/2021 | Lehane | H04L 41/5019 |
| 11,356,889 | B2 * | 6/2022 | Li | H04W 40/36 |
| 11,696,119 | B2 | 7/2023 | Bao et al. | |
| 11,743,830 | B2 | 8/2023 | Park et al. | |
| 11,765,645 | B2 * | 9/2023 | Chaysinh | H04W 36/22 |
| | | | | 709/227 |
| 11,792,678 | B2 * | 10/2023 | Li | H04W 28/24 |
| | | | | 370/235 |
| 12,160,911 | B2 * | 12/2024 | Li | H04W 68/005 |
| 12,445,833 | B2 * | 10/2025 | Dees | H04W 12/06 |
| 12,507,287 | B2 * | 12/2025 | Wang | H04W 76/10 |
| 2012/0058742 | A1 * | 3/2012 | Razoumov | H04L 41/5041 |
| | | | | 455/406 |
| 2017/0359731 | A1 | 12/2017 | Soldati et al. | |
| 2019/0205115 | A1 * | 7/2019 | Gomes | H04W 4/50 |
| 2019/0342186 | A1 * | 11/2019 | Mang | H04L 67/52 |
| 2021/0258866 | A1 | 8/2021 | Chou | |
| 2022/0369215 | A1 * | 11/2022 | Dees | H04W 76/14 |
| 2023/0171684 | A1 * | 6/2023 | Sasindran | H04W 48/18 |
| | | | | 370/328 |
| 2024/0107369 | A1 * | 3/2024 | Verma | H04W 28/0278 |
| 2024/0406860 | A1 * | 12/2024 | Kalia | H04W 72/543 |
| 2025/0175435 | A1 * | 5/2025 | Sun | H04L 47/30 |
| 2025/0373569 | A1 * | 12/2025 | Esmail | H04L 12/40163 |

FOREIGN PATENT DOCUMENTS

| CN | 111356157 | A | 6/2020 |
| CN | 107819829 | B | 7/2020 |
| CN | 112105957 | A | 12/2020 |
| CN | 112948900 | A | 6/2021 |
| CN | 113810971 | A | 12/2021 |
| CN | 115380575 | A | 11/2022 |
| CN | 111246488 | B | 5/2023 |
| EP | 2586240 | B1 | 12/2014 |
| EP | 3794377 | A1 | 3/2021 |
| EP | 3857829 | A1 | 8/2021 |
| JP | 5770301 | B2 | 7/2015 |
| JP | 6457085 | B2 | 12/2018 |
| JP | 2019506801 | A | 3/2019 |
| KR | 101894518 | B1 | 9/2018 |
| KR | 101951279 | B1 | 2/2019 |
| KR | 102433075 | B1 | 8/2022 |
| WO | 2011160926 | A1 | 12/2011 |
| WO | 2016163998 | A1 | 10/2016 |
| WO | 2019141894 | A1 | 7/2019 |
| WO | 2020229445 | A1 | 11/2020 |

* cited by examiner

400

| Block Number 404 | 13 |
|---|---|

| System Information Block 402 | |
|---|---|
| Cell Identifier 406 | 9324920 |
| Tracking Area Code 408 | 93240 |
| Uplink-Downlink Configuration 410 | 5 |
| Access Control Barring Factor 412 | p00 |
| Estimated Uplink Speed 414 | 2.3 Mbps |
| Estimated Downlink Speed 416 | 29.8 Mbps |
| Estimated Latency 418 | 13.3 ms |
| Band 420 | n8 |

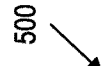

500

Attribute Requirement Mapping 502

| Application Type 504 | | Satellite-Enabled Application | V2X Application | | UAV Application |
|---|---|---|---|---|---|
| | | | Basic | Advanced | |
| Downlink Speed 506 | Min. 512 | 3 Mbps | 10 Mbps | 500 Mbps | 1 Gbps |
| | Rec. | 4 Mbps | 15 Mbps | 950 Mbps | 2.5 Gbps |
| | Max. | 5 Mbps | 25 Mbps | 1 Gbps | 3 Gbps |
| Uplink Speed 508 | Min. 514 | 0.5 Mbps | 1 Mbps | 50 Mbps | 1 Gbps |
| | Rec. | 0.75 Mbps | 3 Mbps | 95 Mbps | 1.3 Gbps |
| | Max. | 1 Mbps | 5 Mbps | 100 Mbps | 1.5 Gbps |
| Maximum Latency 510 | | 500 ms | 40 ms | 10 ms | Application Type |
| Dedicated Band Requirement 516 | | N/A | N/A | N/A | 600 MHz |

*FIG. 5*

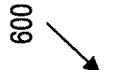
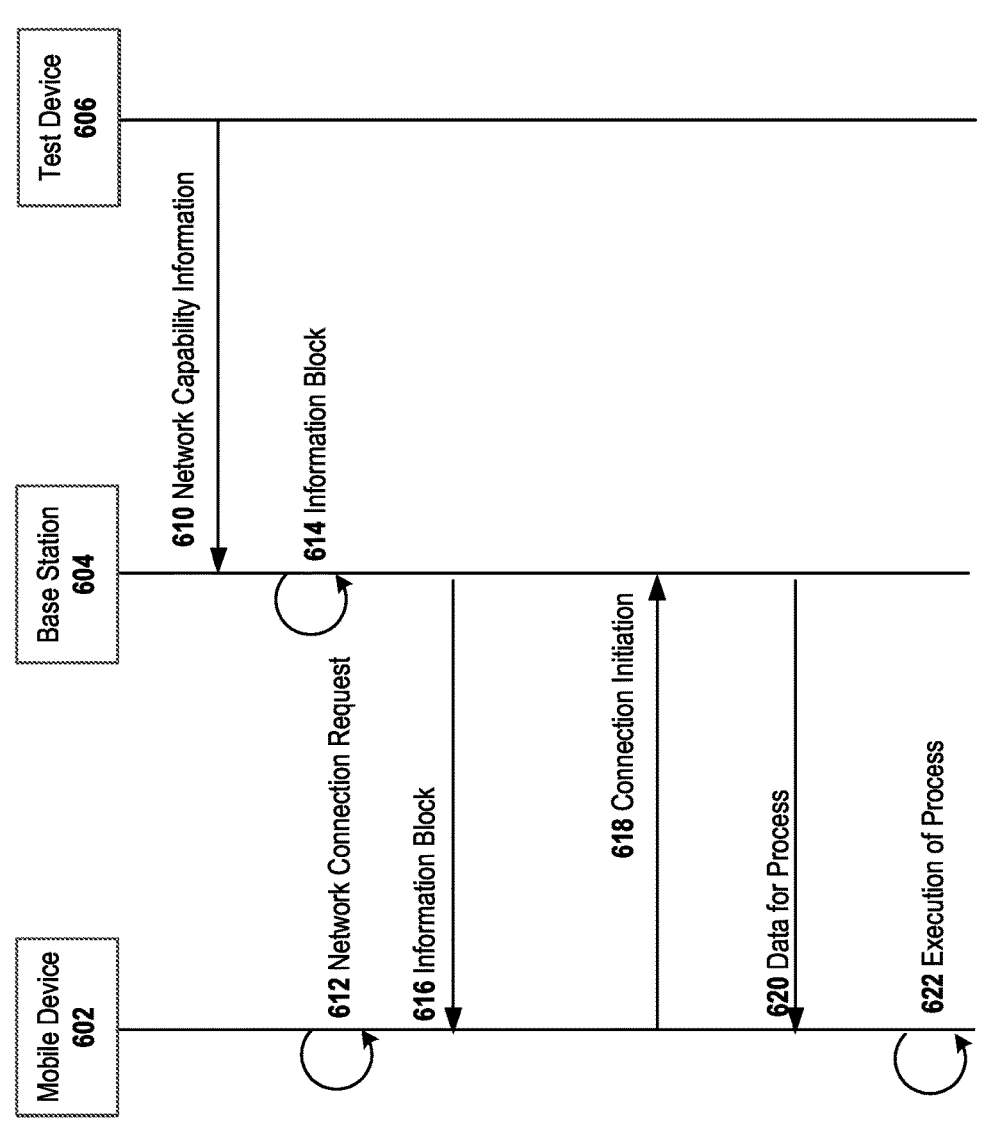
*FIG. 6*

700

NETWORK CONNECTION INITIATION BASED ON APPLICATION-SPECIFIC EVALUATION OF NETWORK CAPABILITIES

BACKGROUND

A cell site, cell phone tower, cell base tower, or cellular base station is a cellular-enabled mobile device site where antennas and electronic communications equipment are placed (typically on a radio mast, tower, or other raised structure) to create a cell, or adjacent cells, in a cellular network. The raised structure typically supports an antenna and one or more sets of transmitter/receivers transceivers, digital signal processors, control electronics, a global positioning system (GPS) receiver for timing (for code-division multiple access (CDMA) or global system for mobile communications (GSM) systems), primary and backup electrical power sources, and sheltering. A communications satellite is an artificial satellite that relays and amplifies radio telecommunication signals via a transponder; it creates a communication channel between a source transmitter and a receiver at different locations on Earth. Communications satellites are used for television, telephone, radio, internet, and military applications. Electronic devices, such as mobile phones or autonomous vehicles, can connect to base stations or communications satellites to transmit or receive data from other devices connected to the cellular network.

A cellphone may not work at times because it is too far from a base station, is unable to communicate with a communications satellite, or because the phone is in a location where cell phone signals are attenuated by thick building walls, hills, or other structures. The signals do not need a clear line of sight but greater radio interference will degrade or eliminate reception. When many people try to use the base station or communications satellite at the same time, e.g. during a traffic jam or a sports event, then there will be a signal on the phone display but it is blocked from starting a new connection. The other limiting factor for cell phones is the ability to send a signal from its low powered battery to the cell site. Some cellphones perform better than others under low power or low battery, typically due to the ability to send a good signal from the phone to the base station or communications satellite.

BRIEF DESCRIPTION OF THE DRAWINGS

Detailed descriptions of implementations of the present invention will be described and explained through the use of the accompanying drawings.

FIG. 5 is a diagram of a data structure illustrating an attribute requirement mapping associated with applications of user equipment, in accordance with one or more implementations disclosed herein.

FIG. 6 is a flowchart illustrating a process for enabling selective initiation of network connections based on application-specific network capability requirements at a mobile device, in accordance with one or more implementations disclosed herein.

Figure 1:
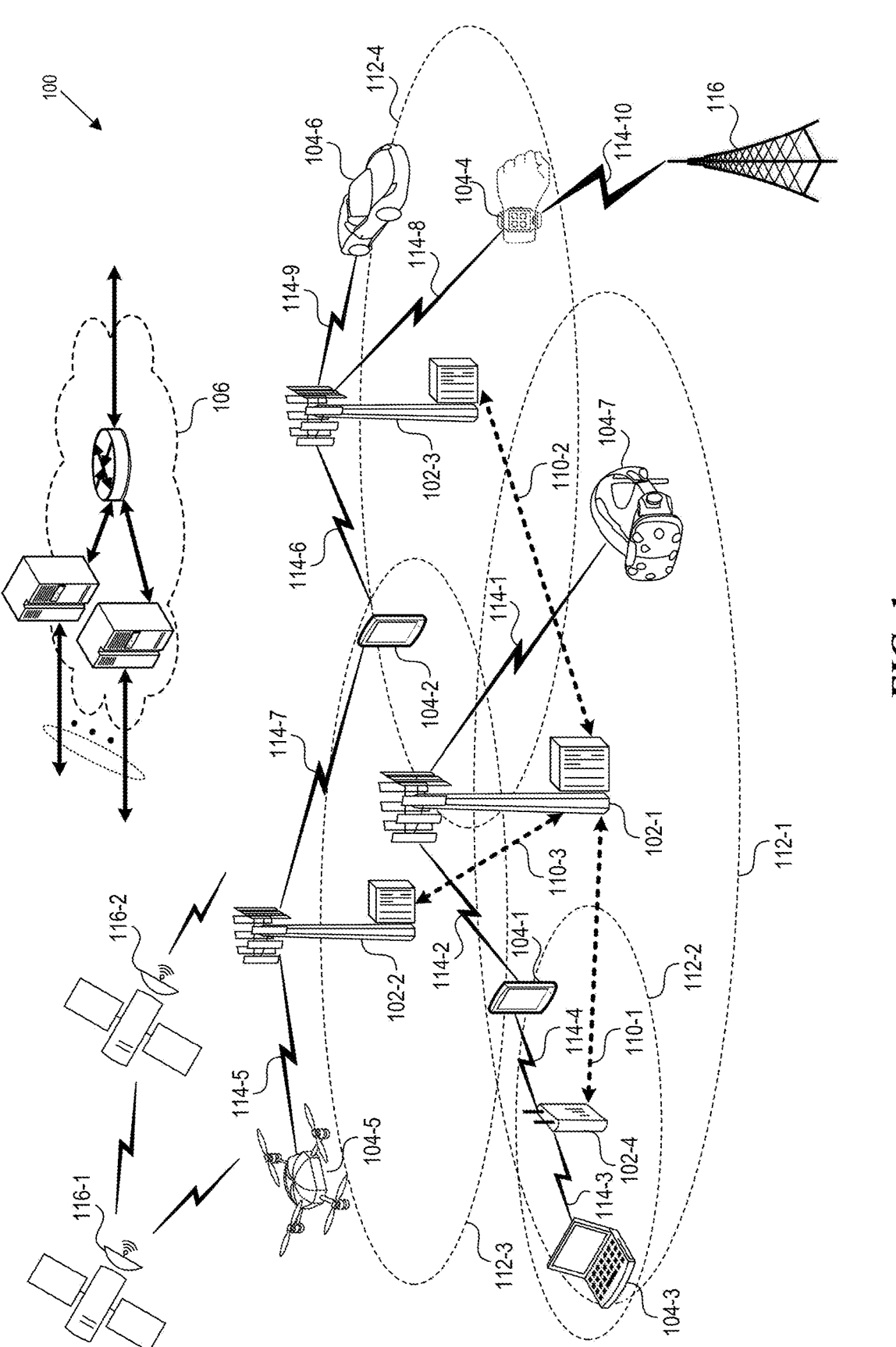
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Applications on mobile devices may have varying compatibility with different network protocols. For example, even if a given mobile device is capable of connecting with a non-terrestrial network (e.g., a satellite link), applications within the user device may have uplink or downlink throughput requirements suited for another available network connection, such as 5G or 4G. As such, attempts to connect to networks may result in a slow or failed connection. Furthermore, such attempts to connect to these networks can lead to crowding and reduce bandwidth on the network. Network nodes themselves, including base stations, do not obtain or provide enough information to accurately assess network performance across the multitude of electronic devices connected to the network. As such, in pre-existing mobile device systems, there is insufficient data for intelligent selection of network paths to improve application-specific performance.

The systems and methods disclosed herein enable application-specific initiation of network connections for mobile devices, such as autonomous vehicles, smartphones, unmanned aerial vehicles (UAVs), tablets, wearable devices, and the like. The base station can generate an information block with measured network capability data associated with the performance of test devices associated with the given base station. For example, the base station can transmit this network capability information (e.g., average downlink or uplink speed, or latency) to a given mobile device. The mobile device can evaluate the received network capability information by comparing the network capability information with an application-specific requested capability. By doing so, the mobile device can determine whether to initiate a connection with the given base station, or whether to continue searching for other suitable connections for the given application.

The disclosed systems and methods enable a base station system (e.g., associated with a base station or network node) to generate an information block or message, such as a system information block (SIB) description or a new SIB corresponding to network capability information associated with a given base station. For example, the base station system receives network performance metrics from devices connected to the associated base station. Based on these network performance metrics, the base station system can generate an information block including an average downlink speed, an average uplink speed, or an average latency across other devices to evaluate network capabilities associated with the given information block. In some implementations, the base station can transmit this information, via a backhaul, to a satellite system for forwarding to a given mobile device. By doing so, the system can initiate a network connection with particular base stations on the basis of information relating to the ground-truth performance of these base stations, thereby providing electronic devices with a connection to an underlying telecommunications network.

Additionally or alternatively, a mobile device system on a mobile device that is associated with the telecommunications network generates or obtain a network capability request via an application or another function associated with the mobile device. An application can include a description of associated attributes or technical features, such as a description of potential data or text transmission, control commands (e.g., for UAV commands), or transmission of safety messages. Based on these technical features, the mobile device system can determine required (e.g., minimum, maximum, or recommended) network performance metrics for the given application, and transmit these metrics (e.g., via a satellite backhaul and a satellite system) to the base station system. The mobile device can receive network capability data from the base station system, comprising the network performance metrics, in order to determine whether to connect to the associated base station. By preventing such connections in situations where a base station exhibits incompatible network capabilities, the system improves the available bandwidth of the corresponding base station, while preventing unexpected or unreliable application behavior at the mobile device due to an inadequate network connection.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
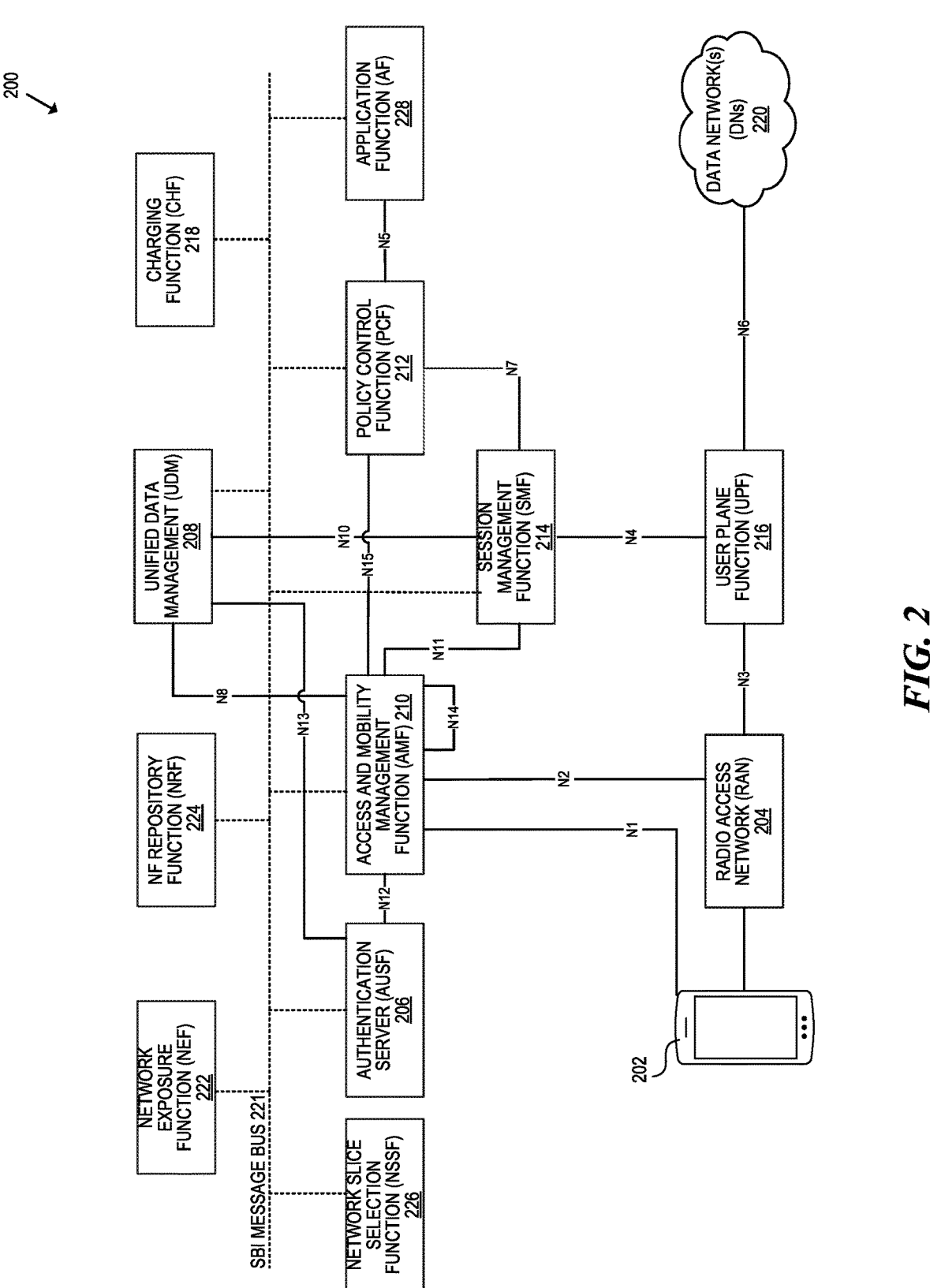
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Network Capability Evaluation System

Figure 3:
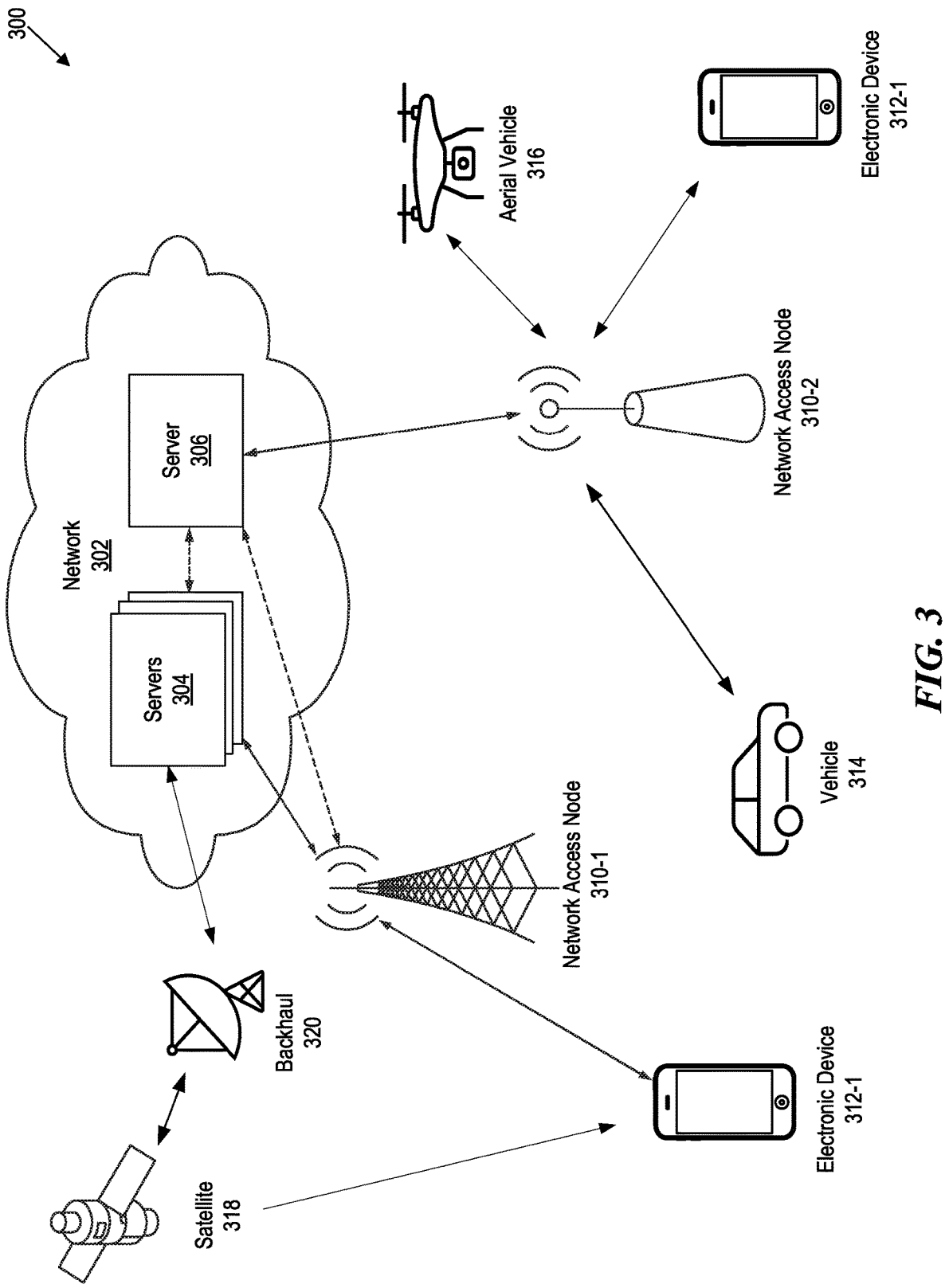
FIG. 3 is a block diagram that illustrates a network of mobile devices capable of executing applications with network capability requirements, in accordance with one or more implementations disclosed herein.

FIG. 3 is a block diagram that illustrates an environment (e.g., a network capability evaluation system environment) of mobile devices capable of executing applications with network capability requirements, in accordance with one or more implementations disclosed herein. For example, FIG. 3 includes components of network 302, including one or more servers 304 or 306. For example, the network 302 can interface with backhaul systems (e.g., backhaul 320) or network access nodes 310. Network access nodes 310 enable communication of mobile devices or user equipment, such as an aerial vehicle 316, a vehicle 314, or electronic devices 312 with other devices associated with the network 302 and/or the network access nodes 310. The backhaul 320 enables communication of the network 302 (e.g., the servers 304 or 306) with non-terrestrial systems, such as a satellite 318. As such, the network 302 enables flexible communication between user equipment at different locations, via different network access nodes.

For example, the network 302 can include a 5G network, as described above. The network 302 can include servers 304 or 306, which can include one or more systems associated with the telecommunications network. For example, the server 306 can include hardware or software components associated with the functioning of the network access node 310-2, including storage, processors, or other components as described in relation to FIG. 7. The server 306 can include media capable of receiving network performance measurements (e.g., network capability measurements) from test devices and transmitting such information to user equipment associated with the network (through corresponding network access nodes and/or through corresponding backhauls). In some implementations, the server 306 can initiate and/or terminate network connections associated with an associated base station or network access node. For example, the network access node 310-1 can terminate or instantiate a network connection with the electronic device 312-1 based on information relating to the electronic device and/or associated applications. Alternatively, an electronic device (e.g., the electronic device 312-1) can determine to terminate or instantiate a network connection with the network access node 310-1.

For example, the environment 300 can include user equipment systems. A user equipment system can include hardware or software components associated with user equipment (e.g., an electronic device, such as a mobile device, a vehicle, or an unmanned aerial vehicle). For example, electronic devices 312, vehicle 314, and aerial vehicle 316 include user equipment systems. A user equipment system can include physical components, such as processors, storage media, user displays, and/or other components (e.g., as described in FIG. 7 with respect to computer systems). In some implementations, the user equipment system can include or execute applications, which can include network capability requirements. In some implementations, a user equipment system can communicate with satellites, such as through a GPS interface. For example, the user equipment system can determine whether a given base station (e.g., the network access node 310-1) has sufficient performance (e.g., an uplink speed, downlink speed, or latency) as compared to the network capability requirements for a requested application on the user equipment system.

In some implementations, a user equipment system can include a vehicle system, such as an autonomous vehicle system. For example, the vehicle 314 can include a vehicle system, such as hardware or software components capable of communicating through a cellular vehicle-to-everything (C-V2X) standard, or another network standard for vehicle connectivity with other user devices, such as mobile devices associated with pedestrians, or electronic devices associated with traffic control devices. For example, C-V2X enable device-to-network connection, through which the vehicle system can communicate with vehicle-to-network (V2N) applications, such as cloud services. Additionally or alternatively, C-V2X enables device-to-device communication, such as vehicle-to-vehicle (V2V), vehicle-to-infrastructure (V21) and/or vehicle-to-pedestrian (V2P) applications. As such, technical requirements and features associated with various C-V2X-based applications can vary (e.g., a basic safety message associated with the vehicle-to-pedestrian system can require lower uplink/downlink speeds as compared to serious safety warnings from vehicle-to-infrastructure connections). In some implementations, a vehicle system can measure or provided geographic coordinate data or location data associated with the vehicle, including global positioning system (GPS) data or cellular network-derived location data. As such, the network capability evaluation system disclosed herein enables the vehicle system to prioritize or connect to base stations or other devices on the basis of network capability information, including location information associated with the base stations, depending on the requirements of the associated applications or processes on the vehicle system.

For example, a user equipment system can include an unmanned aerial vehicle (UAV) or another aerial vehicle, such as aerial vehicle 316. An aerial vehicle can include aircraft, such as airplanes, helicopters, airships, gliders, paramotors, or hot air balloons. Aerial vehicles can include manned or unmanned vehicles, including drones. As such, aerial vehicle systems can include location information relating to geographic coordinates, such as latitude and longitude, as well as elevation information. In some implementations, aerial vehicle systems can transmit or receive, through the network 302, information relating to pitch, roll, yaw, thrust, or other information for maneuvering of the aerial vehicle. As such, aerial vehicles can include particular network capability requirements (e.g., including minimum uplink or downlink speeds, or maximum tolerable latency time periods).

At least some of the user equipment systems can be test devices that measure parameters of the network 302, the network access nodes, or connections to the network access nodes. Alternatively, the environment 300 can include additional test devices to measure the parameters. The test devices can periodically send parameter measurements to the servers 304 or 306.

Network access nodes, such as the nodes 310-1 and 310-2, broadcast information blocks to devices that are connected to or requesting to connect to the node. An information block can include a structured collection of information (e.g., of a uniform format) that is broadcast periodically (e.g., at a set periodicity), or at certain times, such as when a connection request is received from a user device. For example, an information block comprises a master information block that includes information relating to a given network access node (e.g., a physical cell). For example, a master information block include information relating to a physical cell identifier associated with the node that is broadcast periodically for receipt at electronic devices. The master information block can include information including the system bandwidth or band (e.g., band 420), the antenna configuration, and the system frame number.

Figure 4:
FIG. 4 is a diagram of a data structure illustrating a system information block, in accordance with one or more implementations disclosed herein.

FIG. 4 is a diagram of a data structure 400 illustrating a system information block 402, in accordance with one or more implementations disclosed herein. For example, the system information block 402 includes a block number 404, a cell identifier 406, a tracking area code 408, an uplink-downlink configuration 410, an access control barring factor 412, an estimated uplink speed 414, an estimated downlink speed 416, an estimated latency 418, and/or a channel bandwidth 420. By including such information and transmitting this information to electronic devices connected to the network, a network access node (e.g., a base station) enables such electronic devices to evaluate the estimated performance associated with a connection to the given network access node. As such, electronic devices can determine to connect to or terminate a connection with a network access node based on this information, thereby improving network traffic management and avoiding poor user experience during execution of an application or a process on the electronic device due to unsatisfactory network capabilities. For example, if an electronic device does not connect to a network node that does not offer sufficient bandwidth for an application executed by the electronic device, the device does not exhaust the node's resources. Furthermore, since a conventional system information block is a data structure that is transmitted to electronic devices under existing protocols and device configurations, the modified system information block described herein enables an electronic device to obtain the information for evaluating a connection's estimated performance without requiring significant hardware modifications to electronic devices or network access nodes or significant deviations from the communication protocols used to connect electronic devices to network access nodes.

In some implementations, an information block includes a system information block, which can include an information block that carries relevant information for user equipment (e.g., electronic devices), such as information to enable an electronic device to access a cell or perform cell re-selection. In some implementations, a system information block includes a number (e.g., block number 404) and can be among a set of other information blocks. For example, system information blocks can include network parameters. A network parameter can include data that characterizes the network or network access node, such as a cell identifier 406, a tracking area code 40, an uplink-downlink configuration 410, an access control barring factor 412. In some implementations, a network parameter can include real-time data that may be monitored over time, such as dynamically tracked uplink or downlink speeds or latency measurements. In disclosed implementations, the system information block includes an estimated uplink speed 414, an estimated downlink speed 416, and an estimated latency 418. For example, by including information relating to the network and/or corresponding cell site, electronic devices receiving such information can make informed decisions relating to cell site selection based on the network capabilities available to the devices. By doing so, an electronic device can determine whether a cell site provides sufficient network performance for successful or satisfactory execution of a given process or application.

For example, an information block can include network parameters that include network capability metadata. Network capability metadata can include data associated with the performance or capabilities of a network. For example, network capability metadata can indicate an estimated or average uplink speed, downlink speed, or latency. For example, the network capability evaluation system can determine an estimated uplink speed, downlink speed, or latency based on corresponding measurements of uplink speed, downlink speed or latency associated with test devices connected to the associated network access node (e.g., base station). By measuring uplink speed, downlink speed, and latency at test devices, the network capability evaluation system can generate estimates of network capabilities at a given electronic device, thereby enabling the electronic device to instantiate or terminate a connection with the associated network access node based on whether such estimates are consistent with the requirements of applications associated with the user equipment.

For example, an uplink speed can include a speed of uploading data (e.g., a value of data size per second) from an electronic device to another entity, such as a base station. For example, the uplink speed can include a value in megabytes per second, gigabytes per second, or other measurement units that indicate an amount of data transferred per unit time. For example, an electronic device can upload a file, a request (e.g., a request for data), metadata, or a query to a network access node, with a speed associated with the uplink speed.

A downlink speed can include a speed of downloading data (e.g., a value of data size per second) from an entity (e.g., a base station) to an electronic device. For example, the downlink speed can include a value in megabytes per second, gigabytes per second, or other measurement units that indicate an amount of data transferred per unit time. For example, an electronic device (e.g., an autonomous vehicle) can receive an information block, requested information (e.g., traffic pattern or routing data) from a network access node, thereby enabling execution of an associated application on the electronic device (e.g., a vehicle maneuvering system associated with the vehicle). As such, the downlink speed can affect performance of applications of electronic devices.

A latency can include a measure of delay in a network communication. For example, latency can indicate a period of time associated with a first byte of data to reach a client device (e.g., an electronic device) from a server (e.g., a system associated with the network node). In some implementations, a latency includes a round trip time (RTT) associated with a time period necessary for a client device to send a request to a server (e.g., a system associated with a base station or a network access node) and receive a response from the server. In some implementations, a latency can be measured based on a ping command, where the latency is measured based on determination of a time for 32 bytes of data to reach a destination and receive a return response. As such, the latency of a network connection between an electronic device and a corresponding network access node can influence the performance of an application of the electronic device.

In some implementations, the network capability evaluation system enables network capability measurements, such as measurements of the estimated uplink speed 414, estimated downlink speed 416, or estimated latency 418, shown in FIG. 4, associated with a given network access node. A network capability measurement can include a measurement of network capability data, including any information relevant to the capability or performance of a given network access node (e.g., a base station). For example, the base station can monitor time-series data associated with uplink speeds, downlink speeds, and/or latency associated with test devices connected to the given network access node in order to determine average speeds during a specified period of time, and determine the estimated uplink, downlink, or latency accordingly. For example, a test device can include any electronic device connected to the network capable of enabling network capability evaluation or determination. As such, the network access node enables the network capability evaluation system to estimate network capability metadata associated with a given base station based on other devices connected to the network, for further transmission and evaluation by a given electronic device.

Based on network capability metadata received from the base station within the system information block 402, an electronic device of the network capability evaluation system can determine compatibility of an associated application with the network capability metadata. FIG. 5 is a diagram of a data structure 500 illustrating an attribute requirement mapping 502 associated with applications of user equipment, in accordance with one or more implementations disclosed herein. The attribute requirement mapping 502 enables the electronic device to determine required or recommended network capabilities for satisfactory performance of a given associated application. By doing so, the system can determine whether a given base station has a network capability or performance that is consistent with a given application and determine to instantiate or deny a connection with the base station accordingly.

For example, the attribute requirement mapping 502 can include an application type 504. An application type can include a categorization or classification of an application that can fully or partially determine a set of required or recommended network capabilities for execution of the given application. Application types can include satellite-enabled applications, V2X applications, or UAV applications. For example, the applications or application types can indicate attributes or technical features. As an illustrative example, C-V2X applications can include remote driving with haptic feedback or sensor sharing that require relatively large uplink or downlink speeds for safe or efficient execution, while simpler satellite-enabled applications may require less throughput as less urgent data may be transmitted.

For example, an application type can include indications of associated downlink speeds 506, uplink speeds 508 or latencies 510, indicating required or recommended values of the respective network parameters. For example, the attribute requirement mapping can include a minimum downlink speed 512, a minimum uplink speed 514, a maximum latency tolerance 510, or a dedicated band requirement 516. As an illustrative example, a UAV application may include an indication of a requirement for a dedicated unlicensed or licensed band in a given frequency range. Additionally or alternatively, the attribute requirement mapping can specify minimum, maximum, or recommended values for a given network parameter for a given application type. By specifying or determining requirements for applications, the network capability evaluation system enables determination of conditions or performance metrics associated with base stations where a given application may work in unsatisfactorily due to, for example, inconsistent downlink speed, uplink speed, or latency values. As such, the network capability evaluation system enables an electronic device to determine whether to instantiate, deny or terminate a connection with a given network access node based on requirements associated with applications that are executable on the electronic device, thereby providing application-dependent network connectivity to improve performance of the given application.

For example, a process (e.g., an application) can include a computer package, program, algorithm, software, or computational method associated with an electronic device to perform functions. As an illustrative example, a UAV can include a routing system that includes a routing application dedicated to determining target geographic routes through which the UAV can maneuver. In some implementations, the network capability evaluation system, through the electronic device, can cause modification of a process (e.g., modification of a protocol) associated with a process or application. For example, the network capability evaluation system can modify a geographic routing determined by a UAV's routing application on the basis of network capability data from one or more base stations within the network. For example, a geographic routing includes a path, a set of directions (e.g., driving directions), or a set of intended maneuvers associated with geographic movement of a vehicle. As such, the network capability evaluation system enables modification of application behavior to improve network performance associated with an application associated with a given base station.

An attribute associated with an application can indicate a characteristic or technical feature associated with a process or application. For example, an attribute can indicate a technical feature that includes a function associated with the application. As an illustrative example, a process for determining a geographic routing for a UAV can indicate an attribute (e.g., a technical feature) associated with dynamic route determination. In some implementations, the network capability evaluation system (e.g., at the electronic device) can indicate an associated set of network requirements associated with a given application, thereby tailoring the network connection request to an application associated with the electronic device. As such, the network capability evaluation system disclosed herein enables application-specific evaluation of network performance associated with network access nodes.

Based on determination of requirements or recommendations associated with network performance for execution of particular applications or processes, an electronic device can generate or obtain a network connection request, where the network connection request indicates requested (e.g., recommended) or required (e.g., minimum or maximum) network parameters for satisfactory operation of a given application or process. For example, the network connection request can indicate a minimum uplink speed 514, a minimum downlink speed 506 and/or a maximum latency tolerance 510 associated with a given application or process to be executed. By generating or obtaining this network connection request, the electronic device can compare network capability metadata associated with base stations with these application-specific network capability requirements to determine whether or not to connect to a given base station. As such, the network capability evaluation system enables prevention of network connections that are unsuitable for a given application, thereby reducing ineffective network traffic, while preventing poor user experience due to unsatisfactory execution of the process at the electronic device.

Flowchart for Network Evaluation

FIG. 6 is a flowchart illustrating a process 600 for enabling selective initiation of network connections based on application-specific network capability requirements at a mobile device, in accordance with one or more implementations disclosed herein. For example, the network capability evaluation system can determine to initiate or terminate connections with network access nodes based on whether the network access node has network capabilities consistent with an application to be executed on a user equipment system. For example, the network can include a user equipment system (e.g., mobile device 602), a base station (e.g., a network node 604), and a test device 606.

At operation 610, a base station 604 can receive network capabilities measurements from test devices. For example, the base station can receive, from a plurality of test devices deployed in the telecommunications network, measurements of network capabilities measured by the test devices as the test devices communicate with the base station. As an illustrative example, the base station can receive information, such as time-series data, associated with other devices connected to the network through the base station. The measurement data can indicate network speeds, such as uplink or downlink speeds or latency measurements. By receiving such measurements, the base station can more accurately determine network capabilities based on ground-truth data at devices similar to the user equipment or mobile device 602.

In some implementations, the base station 604 can generate location data associated with the test devices and generate the information block to include this location data. For example, the base station can receive, from a plurality of vehicles, a set of geographic coordinates and a set of network capability measurements. Each geographic coordinate can indicate a location of a corresponding vehicle associated with a corresponding network capability measurement. The base station can generate location data based on the set of geographic coordinates and the set of network capability measurements. As an illustrative example, the base station can receive information about how network parameters, such as downlink or uplink speed, may vary across geographic regions based on geographic coordinates associated with the test devices. By doing so, the base station can provide contextual information to the user equipment system (e.g., through the transmitted information block) to enable the user equipment system to obtain estimated network parameters for a location corresponding to the user equipment system.

At operation 612, the mobile device 602 can obtain a network connection request associated with a process. For example, the user equipment system can obtain, at the user equipment system, a first network connection request associated with a first process. The first network connection request can include an indication of a minimum uplink speed, a minimum downlink speed, or a maximum latency tolerance. For example, the system can determine requirements for a process (e.g., an application, such as an autonomous driving routing program) for satisfactory performance of the process. As an illustrative example, an autonomous driving routing program can operate more effectively with faster downloaded safety or road conditions data, thereby requiring a relatively high required or recommended downlink speed compared to uplink speeds. By determining recommended or required network parameters for satisfactory execution of a program or application, the network capability evaluation system enables improvements to application performance and prevents unexpected or undesirable behavior during execution of processes due to network connectivity issues.

In some implementations, the mobile device 602 can receive another information block corresponding to another base station (e.g., a second network node) and determine to terminate or initiate connections accordingly. For example, the user equipment system can receive, at the user equipment system from a second network node, a second information block that contains a second set of network capability metadata. Based on determining that second network capability metadata in the second information block is consistent with the first network connection request, the user equipment system terminate the connection with the first network node and initiate a connection with the second network node. As an illustrative example, the mobile device 602 can receive data suggesting that another network access node is associated with more desirable network parameters (e.g., closer to a recommended value) as compared to the requested parameters within the network connection request. As such, the mobile device 602 can terminate the connection to the first network node and initiate a new connection with the second node, thereby improving application performance.

In some implementations, the mobile device 602 can obtain the network connection request based on attributes associated with the process. For example, the user equipment system can determine an attribute associated with executing the first process, where the attribute indicates one or more technical features associated with the first process. The user equipment system can determine the minimum uplink speed, the minimum downlink speed, or the maximum latency tolerance based on the attribute. As an illustrative example, the mobile device 602 can determine, using the attribute requirement mapping 502 of FIG. 5, network parameter requirements for a given process based on technical features associated with the application, such as the ability to control a UAV remotely, which may indicate a higher minimum downlink speed or a lower latency tolerance as compared to applications without such a feature. By doing so, the system enables decisions tailored to the application or process to be executed at the user equipment system.

At operation 614, the base station 604 can generate an information block. For example, the base station can generate an information block that includes the measurements of the network capabilities. As an illustrative example, the base station can generate an information block that includes information relating to the average latency, average uplink speed, average downlink speed, or other network-related metrics. The base station can include other information, such as the cell identifier, tracking area code, uplink-downlink configuration, access control barring factor, or band. As such, by generating an information block, the network capability evaluation system enables subsequent evaluation of the base station for compatibility with applications or processes associated with a user equipment system.

In some implementations, the base station generates, within the information block, measurements on noise rise or interference over thermal (IoT), such as at pre-determined intervals (e.g., every 15 minutes). High IoT values can indicate a presence of interference between base stations in time-division duplexing (TDD) systems. For example, the information block includes an IoT value that reflects interference between base stations across large distances due to atmospheric ducting. Thus, such an IoT value within the information block can indicate potential uplink impairment for any devices connected to the given base station. As such, devices receiving such information can determine not to connect to the base station for applications that rely on reliable uplink connections.

In some implementations, the base station generates the information block to include an indication of network artificial intelligence/machine learning (AI/ML) capabilities, including information relating to training or inference operations executed by the base station. As such, the information block can enable devices to determine compatibility with applications with AI/ML compatibility (e.g., where AI/ML reference models are similar). For example, the information block enables training of AI/ML models on a connected device, or on the network (e.g., at the base station) based on connectivity between the base station and the connected device.

In some implementations, the base station generates the information block to include information relating to broadcast or multicast capabilities. As an illustrative example, devices can utilize such information within the information blocks to determine compatibility with low power TV (LPTV) or 5G television broadcasts (e.g., compatibility with associated decoding operations). Thus, the network capability evaluation system enables devices to evaluate multimedia application-specific compatibility with a given base station.

In some implementations, the base station can generate the information block based on average network parameters associated with the test devices. For example, the base station can determine, based on the measurements of network capabilities, an average uplink speed, an average downlink speed, or an average latency. The base station can generate the information block to include the average uplink speed, the average downlink speed, or the average latency. As an illustrative example, the base station generates an average for each network parameter (e.g., uplink speed, downlink speed, or latency) across all of the test devices. The average can include a mean, median, mode, or other statistical measures as well. In some implementations, the information block includes other statistical measures associated with the measurements, such as standard deviations, or root-mean-square values of associated network parameters. By doing so, the base station can estimate the network capability associated with the base station accurately.

In some implementations, the base station can calculate the average network parameters based on time-series data associated with the network parameters. For example, based on monitoring the measurements of network capabilities, the base station can generate a set of time-series data of uplink speed, downlink speed, or latency during a specified period of time. The base station can compute, based on the set of time-series data the average uplink speed during the specified period of time, the average downlink speed during the specified period of time, or the average latency during the specified period of time. For example, the base station can receive measurements from test devices over a period of time relating to network capabilities and generate the average speeds based on time-averages of this data. As such, the base station can generate more accurate estimates of network capabilities by mitigating the impact of short-term variations in speeds.

In some implementations, the base station can detect a change in network capabilities over time and transmit an updated information block to the user equipment. For example, the base station can determine, based on the measurements of network capabilities, a change in network capability. The base station can generate an updated information block based on the change in network capability. The base station can provide the updated information block to the user equipment. As an illustrative example, the base station can determine that a newly calculated average network parameter (e.g., average uplink speed) differs from a previously calculated average network parameter by beyond a threshold value. Based on comparing these two parameters, the base station can determine to update the information block and transmit this updated block to the mobile device 602. As such, the user equipment system can receive up-to-date information, thereby enabling more accurate determinations of network capabilities of the base station.

At operation 616, the base station 604 can provide the information block to the user equipment system. In some implementations, the user equipment uses the information block to initiate a connection with the base station in response to a determination at the user equipment that the network capabilities in the information block are consistent with a network connection request associated with a process. For example, the base station can transmit the information block to the user equipment system via an antenna or another communication module (e.g., over radio waves corresponding to 4G or 5G bands). In some implementations, the base station 604 can broadcast this information block periodically at a pre-determined periodicity.

In some implementations, the base station can transmit the information block to the user equipment system via a satellite system. For example, the base station can determine a satellite system associated with a backhaul connection to the base station. The base station can transmit the information block to the satellite system to cause the satellite system to transmit the information block to the user equipment. As an illustrative example, the base station system can transmit the information block to a backhaul capable of communicating with the satellite. The satellite can transmit this information directly to the user equipment system via a satellite communication interface at the user equipment. By doing so, the user equipment can receive information relating to base stations even if the equipment is not within range of the base station, thereby enabling the user equipment to plan ahead based on the base station's network capability data (e.g., in situations where a planned routing of an autonomous vehicle may lead the vehicle to be in range of the base station).

Additionally or alternatively, at operation 616, the mobile device 602 can receive the information block from the base station. For example, the user equipment system can receive a first information block that is associated with a first network node and that contains a first set of network capability metadata. The corresponding network capability metadata of the first set of network capability metadata can characterize a connection to the first network node and include an estimated uplink speed associated with the first network node, an estimated downlink speed associated with the first network node, or an estimated latency associated with the first network node. For example, the mobile device 602 can receive the information block at a network interface. By doing so, user equipment systems can receive information relating to network capabilities associated with the base station and determine to initiate or terminate connections with the base station accordingly.

At operation 618, the mobile device 602 can initiate a network connection depending on whether network capability metadata is consistent with the network connection request. For example, based on determining that first network capability metadata in the first information block is consistent with the first network connection request, the user equipment system can initiate a connection with the first network node. For example, the mobile device can determine whether the network capability metadata is consistent with the network connection request associated with the process. By doing so, the system can determine to connect to the first base station in situations where the base station is likely to perform well enough for the given process or application associated with the user equipment.

In some implementations, the user equipment system can determine that the network capability metadata is consistent with the network connection request based on comparing estimated network parameters with the respective minimum network parameters. For example, the user equipment system can determine that the estimated uplink speed is greater than the minimum uplink speed, determine that the estimated downlink speed is greater than the minimum downlink speed, or determine that the estimated latency is less than the maximum latency tolerance. By doing so, the user equipment system can ensure that the base station's network capabilities are consistent with any or all requirements imposed by the application or process to be executed.

In some implementations, the user equipment system can determine that a second information block associated a second network node includes network capability metadata that is consistent with the first network connection request and determine to initiate a connection to the second network node in lieu of the first network node. For example, the user equipment system can receive, at the user equipment system from a second network node, a second information block that contains a second set of network capability metadata. Based on determining that second network capability metadata in the second information block is consistent with the first network connection request, the user equipment system can terminate the connection with the first network node and initiate a connection with the second network node. As an illustrative example, the user equipment system can determine that a different cell site includes network capabilities that are consistent with the application (e.g., have improved uplink/downlink speed or latency as compared to the first network node). As such, the user equipment system can determine to switch to this node, thereby improving network performance at the user equipment system.

In some implementations, the user equipment system can deny the first network connection request based on a determination that the network capability metadata is inconsistent with the first network connection request. For example, the user equipment system can, based on determining that the first network capability metadata in the first information block is inconsistent with the first network connection request, deny the first network connection request. As an illustrative example, the user equipment system can determine that the measured network capability metadata is inconsistent with requirements associated with the first process. As such, the user equipment system can prevent a faulty or undesirable network connection by denying the connection to the first network node and continuing to search for other network nodes with improved network capability. By doing so, the network capability evaluation system enables improved selection of base stations at user equipment systems, thereby improving device or process performance.

At operation 620, the mobile device 602 can receive data associated with the process from the base station 604 for execution of the process. For example, the application or process can cause the user equipment system (e.g., the mobile device 602, such as a device associated with a vehicle) to request information (e.g., generate a query for routing information) from the network via the base station 604. Based on this query, the mobile device 602 can receive data associated with the process, such as traffic or weather information related to the vehicle's planned route. By doing so, the mobile device 602 can execute the process while maintaining a connection with the base station.

For example, at operation 622, the mobile device 602 can execute the process while connected to the base station 604. For example, the user equipment system can execute the first process while connected to the first network node. As an illustrative example, the process can generate a route based on received information (e.g., traffic or weather information) and cause a vehicle to maneuver according to this route while connected to the base station.

In some implementations, the user equipment system can network connection requests for other processes and vary connections with base stations accordingly. For example, the user equipment system can obtain, at the user equipment system, a second network connection request associated with a second process. The user equipment system can receive, at the user equipment system from a second network node, a second information block that contains a second set of network capability metadata. Based on determining that second network capability metadata in the second information block is consistent with the second network connection request, the user equipment system can terminate the connection with the first network node and initiate a connection with the second network node. In some implementations, the user equipment system can determine that the first information block is inconsistent with the network connection request. Based on one or more of these determinations, the user equipment system can terminate the connection with the first network node and initiate a connection with the second network node. The user equipment system can execute the second process while connected to the second network node. For example, the user equipment system can determine network requirements for a second application (e.g., through the attribute requirement mapping 502 of FIG. 5) and determine to change network connections to connect to a different base station due to differences in such requirements. By doing so, the user equipment system can dynamically connect to improved network nodes on the basis of the process or application to be executed.

In some implementations, the user equipment system can modify the protocol associated with the process based on the network capability metadata from the information block. For example, the user equipment system can, based on the first network capability metadata, generate a modified protocol for the first process, and execute the first process according to the modified protocol. For example, the user equipment system can modify the protocol based on location data associated with the base station such that a vehicle, for example, can be routed according to locations with satisfactory network performance associated with the base station. The user equipment system can receive, from a satellite system, a plurality of information blocks. The plurality of information blocks can be associated with a plurality of network nodes. The plurality of information blocks can include location data associated with the plurality of network nodes. Based on the plurality of information blocks, the user equipment system can determine one or more network nodes of the plurality of network nodes, where the one or more network nodes can be consistent with the first network connection request. The user equipment system can generate, based on the plurality of information blocks, the modified protocol for the first process, where the modified protocol indicates a target geographic routing for a vehicle associated with the user equipment system. For example, the user equipment system can cause a routing system for an autonomous vehicle to route through geographic regions that are associated with improved network capability metadata (e.g., as in location data associated with the base station system). By doing so, the user equipment system enables improved operation of the process or application to be executed by enabling its adaptation to changing network capabilities associated with one or more network nodes within the network.

In some implementations, the user equipment system can evaluate the presence of a ducting or remote interference situation in which radio signals are trapped between layers in the atmosphere and propagate for long distances in the "duct" (e.g., at certain times or days of the year). Based on this evaluation, the user equipment system can determine not to connect to a base station associated with such ducting or interference and can determine to connect to another base station prior to performing application-related processes (e.g., prior to initiating uplink services).

In some embodiments, based on the information within the information block, the user equipment system can determine base stations with 5G television broadcast services (e.g., where base stations with such capabilities may be deployed for a subset of cell sites, such as with a predetermined approximate spatial periodicity). Based on this information, the user equipment system can buffer multimedia from a network cache or from a device cache when switching between 5G broadcast-capable base stations. For example, the user equipment system can predict a time until the user equipment system connects with another compatible base station. The user equipment system can store an associated portion of a multimedia broadcast according to this predicted time. As such, the network capability evaluation system enables devices to modify network connections and consumption of multimedia to improve the seamlessness of streaming applications.

Computer System

Figure 7:
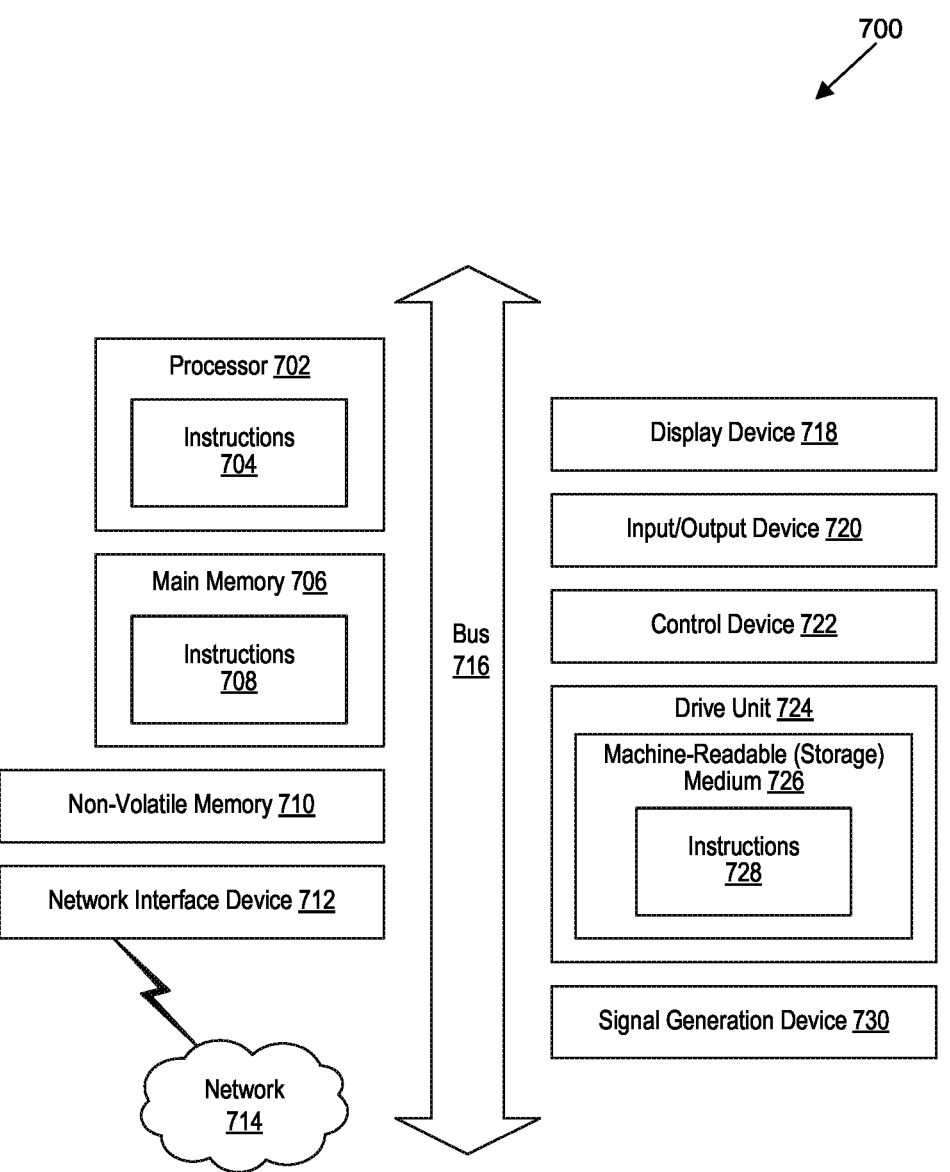
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions when executed by at least one data processor of a user equipment system, cause the system to:

obtain, at the user equipment system, a first network connection request associated with a first process, wherein the first network connection request comprises an indication of a minimum uplink speed, a minimum downlink speed, or a maximum latency tolerance;

receive, at the user equipment system, a first information block that is associated with a first network node and that contains a first set of network capability metadata, wherein corresponding network capability metadata of the first set of network capability metadata characterizes a connection to the first network node and comprises:

an estimated uplink speed associated with the first network node, an estimated downlink speed associated with the first network node, or an estimated latency associated with the first network node;

determine that the first network capability metadata is consistent with the first network connection request;

responsive to determining that the first network capability metadata in the first information block is consistent with the first network connection request, initiate a connection with the first network node of a plurality of network nodes associated with a telecommunications network, wherein network capability metadata associated with another network node of the plurality of network nodes is inconsistent with the first network connection request; and execute the first process while connected to the first network node.

2. The non-transitory, computer-readable storage medium of claim 1, wherein the instructions for obtaining the first network connection request cause the system to:

based on dynamically monitoring a real-time network parameter associated with the first process, determine an average network parameter, wherein the average network parameter comprises an average uplink speed, an average downlink speed, or an average latency; and determine the minimum uplink speed, the minimum downlink speed, or the maximum latency tolerance based on the average network parameter.

3. The non-transitory, computer-readable storage medium of claim 1, wherein the instructions cause the system to:

receive, at the user equipment system from a second network node, a second information block that contains a second set of network capability metadata; and based on determining that second network capability metadata in the second information block is consistent with the first network connection request, terminate the connection with the first network node and initiate a connection with the second network node.

4. The non-transitory, computer-readable storage medium of claim 1, wherein the instructions cause the system to:

obtain, at the user equipment system, a second network connection request associated with a second process;

receive, at the user equipment system from a second network node, a second information block that contains a second set of network capability metadata;

based on determining that second network capability metadata in the second information block is consistent with the second network connection request, terminate the connection with the first network node and initiate a connection with the second network node; and execute the second process while connected to the second network node.

5. The non-transitory, computer-readable storage medium of claim 1, wherein the instructions cause the system to:

obtain, at the user equipment system, a second network connection request associated with a second process;

receive, at the user equipment system from a second network node, a second information block that contains a second set of network capability metadata;

based on determining that second network capability metadata in the second information block is consistent with the second network connection request and that first network capability metadata in the first information block is inconsistent with the first network connection request, initiate a connection with the second network node; and execute the second process while connected to the second network node.

6. The non-transitory, computer-readable storage medium of claim 1, wherein the instructions for determining that the first network capability metadata in the first information block is consistent with the first network connection request cause the system to:

determine that the estimated uplink speed is greater than the minimum uplink speed, determine that the estimated downlink speed is greater than the minimum downlink speed, or determine that the estimated latency is less than the maximum latency tolerance.

7. The non-transitory, computer-readable storage medium of claim 1, wherein the instructions cause the system to, based on determining that the first network capability metadata in the first information block is inconsistent with the first network connection request, deny the first network connection request.

8. The non-transitory, computer-readable storage medium of claim 1, wherein the instructions for causing the user equipment system to execute the first process while connected to the first network node cause the system to:

based on the first network capability metadata, generate a modified protocol for the first process; and execute the first process according to the modified protocol.

9. The non-transitory, computer-readable storage medium of claim 8, wherein the instructions for generating the modified protocol for the first process cause the system to:

receive, from a satellite system, a plurality of information blocks, wherein the plurality of information blocks are associated with a plurality of network nodes, and wherein the plurality of information blocks includes location data associated with the plurality of network nodes;

based on the plurality of information blocks, determine one or more network nodes of the plurality of network nodes, wherein the one or more network nodes are consistent with the first network connection request; and generate, based on the plurality of information blocks, the modified protocol for the first process, wherein the modified protocol indicates a target geographic routing for a vehicle associated with the user equipment system.

10. The non-transitory, computer-readable storage medium of claim 1, wherein the instructions for obtaining the first network connection request cause the system to:

determine an attribute associated with executing the first process, wherein the attribute indicates one or more technical features associated with the first process; and determine the minimum uplink speed, the minimum downlink speed, or the maximum latency tolerance based on the attribute.

11. A user equipment system comprising:

one or more processors; and one or more non-transitory, computer-readable storage media comprising instructions that, when executed by the one or more processors, cause the user equipment system to:

obtain, at the user equipment system, a first network connection request associated with a first process, wherein the first network connection request comprises an indication of a minimum uplink speed, a minimum downlink speed, or a maximum latency tolerance;

receive, at the user equipment system from a first network node, a first information block that contains a first set of network capability metadata, wherein corresponding network capability metadata of the first set of network capability metadata characterizes a connection to the first network node and comprises:

an estimated uplink speed associated with the first network node, an estimated downlink speed associated with the first network node, or an estimated latency associated with the first network node;

determine that the first network capability metadata is consistent with the first network connection request;

responsive to determining that the first network capability metadata in the first information block is consistent with the first network connection request, initiate a connection with the first network node of a plurality of network nodes associated with a telecommunications network, wherein network capability metadata associated with another network node of the plurality of network nodes is inconsistent with the first network connection request; and execute the first process while connected to the first network node.

12. The user equipment system of claim 11, wherein the instructions for obtaining the first network connection request cause the user equipment system to:

based on dynamically monitoring a real-time network parameter associated with the first process, determine an average network parameter, wherein the average network parameter comprises an average uplink speed, an average downlink speed, or an average latency; and determine the minimum uplink speed, the minimum downlink speed, or the maximum latency tolerance based on the average network parameter.

13. The user equipment system of claim 11, wherein the instructions cause the user equipment system to:

receive, at the user equipment system from a second network node, a second information block that contains a second set of network capability metadata; and based on determining that second network capability metadata in the second information block is consistent with the first network connection request, terminate the connection with the first network node and initiate a connection with the second network node.

14. The user equipment system of claim 11, wherein the instructions cause the user equipment system to:

obtain, at the user equipment system, a second network connection request associated with a second process;

receive, at the user equipment system from a second network node, a second information block that contains a second set of network capability metadata;

based on determining that second network capability metadata in the second information block is consistent with the second network connection request, terminate the connection with the first network node and initiate a connection with the second network node; and execute the second process while connected to the second network node.

15. A method comprising:

obtaining, at a user equipment system, a first network connection request associated with a first process, wherein the first network connection request comprises an indication of a minimum uplink speed, a minimum downlink speed, or a maximum latency tolerance;

receiving, at the user equipment system, a first information block that is associated with a first network node and that contains a first set of network capability metadata, wherein corresponding network capability metadata of the first set of network capability metadata characterizes a connection to the first network node and comprises:

an estimated uplink speed associated with the first network node, an estimated downlink speed associated with the first network node, or an estimated latency associated with the first network node;

determining that the first network capability metadata is consistent with the first network connection request;

responsive to determining that the first network capability metadata in the first information block is consistent with the first network connection request, initiating a connection with the first network node of a plurality of network nodes associated with a telecommunications network, wherein network capability metadata associated with another network node of the plurality of network nodes is inconsistent with the first network connection request; and executing the first process while connected to the first network node.

16. The method of claim 15, wherein obtaining the first network connection request comprises:

based on dynamically monitoring a real-time network parameter associated with the first process, determining an average network parameter, wherein the average network parameter comprises an average uplink speed, an average downlink speed, or an average latency; and determining the minimum uplink speed, the minimum downlink speed, or the maximum latency tolerance based on the average network parameter.

17. The method of claim 15, further comprising:

receiving, at the user equipment system from a second network node, a second information block that contains a second set of network capability metadata; and based on determining that second network capability metadata in the second information block is consistent with the first network connection request, terminating the connection with the first network node and initiate a connection with the second network node.

18. The method of claim 15, further comprising:

obtaining, at the user equipment system, a second network connection request associated with a second process;

receiving, at the user equipment system from a second network node, a second information block that contains a second set of network capability metadata;

based on determining that second network capability metadata in the second information block is consistent with the second network connection request, terminating the connection with the first network node and initiating a connection with the second network node; and executing the second process while connected to the second network node.

19. The method of claim 15, further comprising:

obtaining, at the user equipment system, a second network connection request associated with a second process;

receiving, at the user equipment system from a second network node, a second information block that contains a second set of network capability metadata;

based on determining that second network capability metadata in the second information block is consistent with the second network connection request and that first network capability metadata in the first information block is inconsistent with the first network connection request, initiating a connection with the second network node; and executing the second process while connected to the second network node.

20. The method of claim 15, wherein determining that the first network capability metadata in the first information block is consistent with the first network connection request comprises:

determining that the estimated uplink speed is greater than the minimum uplink speed, determining that the estimated downlink speed is greater than the minimum downlink speed, or determining that the estimated latency is less than the maximum latency tolerance.

* * * * *